United States Patent
Kollar

[15] 3,689,535
[45] Sept. 5, 1972

[54] PROCESS FOR PREPARING ETHYLENE GLYCOL ESTERS

[72] Inventor: John Kollar, 6 Spencer Court, Wyckoff, Bergen County, N.J. 07481

[22] Filed: March 24, 1969

[21] Appl. No.: 819,507

Related U.S. Application Data

[63] Continuation-in-part of Ser. No. 763,001, Sept. 26, 1968, abandoned.

[52] U.S. Cl.........260/497 R, 260/287 R, 260/295 R, 260/295.5 R, 260/326.13 R, 260/332.2 C, 260/347.5, 260/410.6, 260/465.3, 260/468 P, 260/468 R, 260/469, 260/471 R, 260/473 S, 260/474, 260/475 N, 260/476 R, 260/481 R, 260/483, 260/484 R, 260/485 G, 260/487, 260/491, 260/635

[51] Int. Cl..............................................C07c 67/04
[58] Field of Search...260/497 R, 410.6 A, 485, 476, 260/475 N, 469, 468 R, 468 P

[56] References Cited

UNITED STATES PATENTS

| | | | |
|---|---|---|---|
| 2,428,590 | 10/1947 | Shokal et al. | 260/497 |
| 2,519,754 | 8/1950 | Gresham et al. | 260/497 |
| 3,427,348 | 2/1969 | Olson | 260/497 |
| 3,479,395 | 11/1969 | Huguet | 260/497 |

*Primary Examiner*—Vivian Garner
*Attorney*—William C. Long and David Dick

[57] ABSTRACT

This invention relates to a process for preparing ethylene glycol esters by intimately contacting a mixture of ethylene, bromine or chlorine (or a bromine or chlorine containing compound) and oxygen, in the presence of a carboxylic acid and a variable valent metal cation. It also relates to a process for preparing vinyl acetate from ethylene, by pyrolysis of ethylene glycol diacetate prepared as above noted, and to the preparation of ethylene glycol monoester as well as ethylene glycol by the hydrolysis of the ethylene glycol di-ester as prepared above.

16 Claims, No Drawings

PROCESS FOR PREPARING ETHYLENE GLYCOL ESTERS

This application is a continuation in part application of U.S. Ser. No. 763,001 filed Sept. 26, 1968, now abandoned.

This invention relates to a process for preparing esters. More particularly this invention relates to a process for preparing glycol esters of carboxylic acids by the reaction of ethylene in the presence of a carboxylic acid. This invention further relates to a process for preparing vinyl acetate from ethylene, by the reaction of ethylene to form ethylene glycol diacetate and subsequently pyrolyzing this compound to form the desired vinyl acetate.

It is an object of this invention to provide an improved process for the preparation of di-esters from ethylene and carboxylic acids, in high yields and selectivities, previously unattainable in the art. It is a further object to provide a continuous process for the preparation of these esters wherein a number of reactants are regenerable. It is a still further object of this invention to prepare vinyl acetate from ethylene. Other objects and advantages will become apparent in the following specification.

In accordance with this invention, it has been found that ethylene glycol di-esters may be readily obtained in high yield and selectivities by intimately contacting ethylene, bromine or chlorine (or a bromine or chlorine containing compound) oxygen and at least one of certain variable valent metal cations, in the presence of a carboxylic acid. (Hereinafter, the use of the expression "halogen" will be used to refer to bromine or chlorine or its compounds). It has also been found that vinyl acetate can be prepared in high yield and selectivity by reacting ethylene as described above and further cracking the ethylene glycol diacetate thus formed, a still further aspect of this invention is the preparation of ethylene glycol and ethylene glycol monoacetate in high yield and selectivity by reacting ethylene as described above and subsequently hydrolyzing the ethylene diacetate thus formed.

Processes for preparing esters from ethylene are known, but all suffer the drawback of low yield and/or low selectivies which makes these processes uneconomical on a commercial scale. In addition, the prior art processes are not regenerable and/or require costly systems for regeneration. For example, in one procedure a mixture of ethylene, acetic acid, a halogen acid and an initiator is reacted to form ethylene glycol diacetate. This process has the long standing disadvantage of low conversion per pass and low selectivity and makes it unsuitable in a commercial scale operation. A further drawback is the necessity of using initiators such as aldehydes and ketones without which in many instances the reaction is essentially inoperative. In addition, as is well known in the art, the oxidation of ethylene by the various prior art methods requires relatively high temperatures, of the order of 200°C. or more.

I have surprisingly found that ethylene can be conveniently reacted in the presence of bromine or chlorine (or a bromine or chlorine containing compound), oxygen, a carboxylic acid and at least one of a particular group of variable metal cations to afford esters in both yield and selectivity, such that the process may be readily employed on a commercial scale. I have also surprisingly found that my invention operates with only certain variable metal cations and that some of these yield extremely high conversions per pass. I have further found that by using the unique combination of a variable metal cation and halogen, the reaction can be carried out at much lower temperatures than previously used for the oxidation of ethylene, and that the reaction can be suitably carried out, if desired, without the use of initiators as described in the prior art. I have further found that the unique combination of using at least one of certain variable valent metal cations and certain bromine or chlorine, or bromine or chlorine containing compounds affords me this surprising increase in yield and selectivity, and allows for reaction at much lower temperatures. I have still further found that my process, unlike prior processes can be successfully employed with a variety of acids. I have further found that a distinct advantage of this invention is the substantially continuous reuse of the bromine or chlorine, or bromine or chlorine containing compound and the variable metal cation. It can thus be appreciated that in accordance with my invention, essentially the only reactants consumed are $O_2$, ethylene and acid. Therefore, by employing the process of this invention, I have eliminated another prior art drawback of either discarding reactants or going through expensive isolation of those reactants which do not form part of the final product. As a still further feature of my invention, I have also found that vinyl acetate can be prepared in high yield and selectivity, by reacting ethylene as noted above, to form ethylene glycol diacetate and subsequently cracking this compound to form the vinyl acetate. Similarly, ethylene glycol and/or ethylene glycol monoacetate may be prepared in high yields and selectivities by reacting ethylene as above and subsequently hydrolysis of the product.

The reaction is preferably carried out in one reaction vessel, although if desired, the reaction may be carried out in two or more vessels. The reaction may be carried out in a batch or continuous operation and particularly with the latter, intermediate products such as the ethylene dihalide and/or ethylene monohalo carboxylate may suitably be recycled into the system to yield additional ethylene glycol diacetate.

In accordance with my invention, I have found that the use of an appropriate halogen source and one or more of the following metals, Te, Ce, Sb, Mn, V, Ga, As, Co, Cu, Se, Cr or Ag under the appropriate conditions of my process, allow for oxidation of ethylene to an ethylene glycol di-ester in high yields and selectivities, and further that the ethylene glycol di-ester thus formed could be converted to vinyl acetate in high yield and selectivities, (i.e., by pyrolysis). As indicated, the invention also contemplates the use of a variety of carboxylic acids, all of which are adaptable to the particular combination of metals and halogen. The carboxylic acids are preferably used as solvent and also used to form the acid moiety of the desired ester. However, if it is desired an inert solvent may be employed along with the carboxylic acid. Examples of such inert solvents are benzene, t-butylbenzene, t-butanol or ethylene glycol diacetate, etc. Included among the suitable acids of my invention are, aliphatic acids, alicyclic mono carboxylic acids, heterocyclic acids and aromatic acids, both substituted and unsubstituted. For example, the invention contemplates the use of lower mono aliphatic acids of one to four carbon atoms such as: formic, acetic, propionic, butyric and isobutyric; intermediate mono aliphatic acids (of from five to 10 carbons) such as: valeric, isovaleric, caproic, enanthic, caprylic, pelargonic and capric; higher mono aliphatic acids (of from 11–30 carbons) such as: lauric, myristic, palmitic, stearic, hexacosanoic and tricosanoic; dialiphatic acids of from two to six carbons, such as: oxalic, malonic, succinic, glutaric and adipic. The invention further contemplates the use of substituted mono aliphatic acids containing one or more functional substituents such as lower alkoxy (methoxy, propoxy), chloro, cyano, lower alkylthio (methylthio, ethylthio, butylthio) and the like, examples of which may be cited as acetoacetic, chloroacetic, chloropropionic, cyanoacetic, methoxyacetic acid and 3-methylthiopropionic acid. Among the aromatic acids contemplated may be mentioned acids containing one or more carboxyl groups such as: benzoic, 1-naphthoic, 2-naphthoic, o-toluic, m-toluic, p-toluic, o-chlorobenzoic, m-chlorobenzoic, p-chlorobenzoic, o-nitrobenzoic, m-nitrobenzoic, p-hydroxybenzoic, anthranilic, m-aminobenzoic, p-aminobenzoic, phenylacetic, 2,4-dichlorophenyoxyacetic, hydrocinnamic, 2-phenylbutyric, 1-naphthaleneacetic, and phthalic. The alicyclic mono carboxylic acids may contain from three to six carbons in the ring, both substituted and unsubstituted, and containing one or more carboxyl groups such as: cyclopropanecarboxylic, cyclopentanecarboxylic and hexahydrobenzoic, The heterocyclic acids may contain from one to three fused rings both substituted and unsubstituted, contain one or more carboxyl groups and containing at least one and less than four hetero atoms such as oxygen, sulphur or nitrogen, examples of which may be cited as: picolinic, nicotinic, 3-indoleacetic, furoic, 2-thiophenacarboxylic, quinolinic, 2-methyl-3-indoleacetic, 3-chloro furoic, and 4-nitronicotinic.

In the more preferred aspects of this invention, the carboxylic acid is an aliphatic acid or aromatic acid, but especially the monophenyl aromatic acids and the lower aliphatic acids such as the lower unsubstituted mono aliphatic acids or benzoic acid and more especially acetic acid.

The invention further contemplates the use of mixed carboxylic acids in any desired ratio, although it is preferred to employ the same acid as solvent and acid moiety of the subsequently desired ester. It is also within the contemplation of this invention that the final ester product may be used as the solvent. The carboxylic acid employed may suitably be any commercially available acid, such as aqueous acids. It is preferred however, to employ commercial acids having no more than 25 percent water, and especially less than 5 percent water, such as 98 percent acetic acid. The acids used may suitably contain the various organic and inorganic impurities normally associated with the various commercial acids and for the purpose of this invention may remain as impurities or removed as one desires.

The variable valent metal compound (metal cation) employed in this invention may be a single salt or mixtures. For example, one may employ as the anion moiety of the salt any of the carboxylic groups of the above-mentioned carboxylic acids and as the cation moiety, Te, Ce, Sb, Mn, V, Ga, As, Co, Cu, Se, Cr or Ag, or a mixture of the metal cations. The valence state of the metal in the initial reaction may be at any valence state normally associated with the metal. For example, one may initially employ the manganous, or manganic cation, the cuprous or cupric cation, cobaltous or cobaltic cation and the like. For the purpose of this invention, the only critical feature for the metals is that they have a variable valence, with any initial valence state being applicable. If desired, the variable metal cation may be added in any form which in solution, under reaction conditions, will yield at least some soluble metal ions. For example, the metal compound to be added may be the metal itself in finely divided form, metal carbonate, oxide, hydroxide, bromide, chloride, lower alkoxide (methoxide), phenoxide or metal carboxylate wherein the carboxylate ion is the same or different from the solvent anion. If it is desired to employ one variable valence metal cation and bromide or chloride in the process of this invention, one may employ any of the above metals in the form of its bromide or chloride. In its preferred aspect, the metal compound is added as its oxide, hydroxide or salt of the acid solvent. In the most preferred aspects of this invention, the carboxylic acid salt of the metal compound is employed and preferably contains the anion of an aromatic acid or aliphatic acid, particularly the anion of the unsubstituted monolower aliphatic acids such as acetic acid, propionic acid and butanoic acid, or benzoic acid, but especially acetic acid, and in the case of Te, the metal is also preferably used as the metal itself or its oxide. The more preferred variable metal cations of this invention divided according to their use in conjunction with a bromide or chloride source are Te, Ce, Sb, Mn, V, Ga, As, Co, Cu, Se or Ag with a bromide source, and more particularly Te, Ce, Sb, Mn or V but especially Te, Ce, Sb or Mn, such as Te and bromine or hydrogen bromide; and Ce, Mn, As, Co, Cu, Se or Cr, with a chloride source, and more particularly Ce, Mn, Co, Cu or Se but especially Ce, Mn or Co.

The metal compound employed may desirably contain impurities normally associated with the commercially available metal compounds, and need not be purified any further. In the preferred aspect of this invention, the commercially available compound is employed.

When it is desired to use a bromine or chlorine containing compound in the initial phase of the reaction instead of bromine or chlorine itself, one may employ any compound capable upon oxidation or by other means, of producing bromide or chloride ions in solution. For example, one may use hydrohalic acids (gaseous or aqueous, preferably concentrated aqueous acid) any metal halide such as the alkali, alkaline earth or heavy metal bromides or chlorides, (potassium bromide, calcium chloride, manganese bromide and the like) the metal bromides or chlorides corresponding to the operable metals of my invention or organic halides such as alkyl trihalides, lower aliphatic halides (propylhalide, pentylhalide), cyclo lower aliphatic halides (cyclohexylhalide) or lower aliphatic dihalides, (ethylene di-chloride, di-bromoethylene) all of which are considered for nomenclature purposes to be compounds capable of producing bromide or chloride anions. The invention also contemplates the use of a mixture of two or more halogen producing compounds, containing the same or different halogen, as well as mixtures wherein the cation of the halide compound may be the same or different from the cation of the other metal compound employed. In the most preferred aspects of this invention, the reaction carried out in the presence of bromine or chlorine or the halogen acid, the alkaline or alkaline earth metal halides or mixtures of both chloride and bromide and especially concentrated hydrobromic acid, concentrated hydrochloric acid or potassium bromide. The halogen employed may suitably contain impurities therein, normally associated with the commercially available halogen and in the preferred aspect of this invention the commercially available materials are employed.

Accordingly, in the preferred aspect of this invention: the carboxylic acid is used as a solvent as well as the moiety for the subsequent ester, and is a lower mono aliphatic acid, especially acetic acid; the halogen is in the form of molecular bromine or chlorine or hydrohalic acid; and the metal cations are Te, Ce, Sb, or Mn such as Te and bromine or hydrobromic acid, in the bromine system and Ce, Mn or Co in the chlorine system.

The various reactants may be employed over a wide range of concentration, the effective minimum concentrations will depend upon the temperature, time and type of halogen and metal employed. Generally, the concentration of halogen expressed in weight percent of bromine or chlorine to total solution, may be from 0.01 percent to 30 percent to higher, but preferably 0.1 percent to 20 percent and especially 0.5 percent to 10 percent. The concentration of total operable cation present expressed in terms of equivalents of cation/equivalents of halogen expressed as bromine or chlorine may suitably vary from 1:01 to 1:100 but preferably 1:0.2 to 1:40 and especially 1:1 to 1:20.

The mole ratio of oxygen to ethylene is not critical and, therefore, any suitable ratios may be used. For example, such ratios as 1:1000 to 1:0.001 may be used. The source of oxygen may be oxygen gas, or a mixture of oxygen and an inert gas such as found in air.

If the carboxylic acid is to be used as the solvent as well as acid moiety, it is used in excess of the theoretical amount needed for reaction. When an inert solvent is employed, the amount of carboxylic acid, for practical reasons, should be at least equivalent to that needed to prepare the final product from ethylene.

The temperature of reaction may vary from 80°C. to the boiling point of the solvent within the reaction zone, but preferably the temperature is between 100° and 200°C., and especially between 120° and 180°C.

The time of reaction will depend to a great extent upon the concentration of reactants, and therefore, may suitably be between 1 minute to one or more days. However, under the more preferred conditions, the reaction time may be from 10 minutes to 4 hours.

As the other aspect of my invention, vinyl acetate can be prepared in both high yield and selectivity by reacting ethylene under the conditions described above to form ethylene glycol diacetate and converting this compound by any known means to form vinyl acetate. For example, this latter reaction may be carried out by reacting ethylene glycol diacetate under pyrolyzing conditions with or without a catalyst. For example, suitable catalysts may be those with large surface areas such as porous plate chips.

The esters prepared from ethylene and the various carboxylic acid compounds of this invention find ready use as solvents and plasticizers. For example, ethylene glycol diacetate may be used as a solvent, or as an intermediate to prepare ethylene glycol or vinyl acetate. Similarly, ethylene glycol di-benzoate may be used as a solvent or as an intermediate to prepare ethylene glycol or vinyl benzoate. If one desires, as an additional feature of the invention any of the ethylene glycol di-carboxylates so prepared are hydrolyzed to prepare ethylene glycol and/or its mono ester. The last step of this process for preparing ethylene glycol and/or its mono ester, may be suitably carried out by well known hydrolysis or saponification methods for preparing alcohols from ester. For example, the ester may be saponified with an aqueous alkali or alkali earth base, at elevated temperatures, to form the mono or di-salt and subsequent acidification to form the desired products. Alternatively, the ethylene glycol ester may be hydrolyzed with water at elevated temperatures, and preferably in the presence of at least a catalytic amount of an acid.

RUNS 1–44

To a glass lined reactor containing 10 gms. of acetic acid is added the appropriate amount of metal and halogen as indicated below. The reaction vessel is then pressurized with 100 p.s.i.a. of oxygen and 200 p.s.i.a. of ethylene. The reaction mixture is then heated with agitation, for 2 hours at 160°C. Ethylene glycol diacetate (EGDA) is obtained in yields as indicated below.

| | gms. of Metal Compound | gms. of Halogen | | % EGDA |
|---|---|---|---|---|
| 1 | .37 K Br | – | | 2.7 |
| 2 | .25 $Br_2$ | | | .3 |
| 3 | .35 Li Cl | – | | 0 |
| 4 | .9 35% H Cl | – | | 0 |
| 5 | .2 Te $O_2$ | .37 K Br | | 23.7 |
| 6 | .2 Te $O_2$ | .5 48% H Br | | 49.5 |
| 7 | .2 Ce $Cl_3$:$7H_2O$ | .37 K Br | | 16.1 |
| 8 | .2 Ce $Cl_3$:$7H_2O$ | .35 Li Cl | | 5.0 |
| 9 | .2 Ce $Cl_3$:$7H_2O$ | .9 35% H Cl | | 6.8 |
| 10 | .2 $Sb_2O_3$ | .37 K Br | | 13.7 |
| 11 | .2 $Sb_2O_3$ | .5 48% H Br | | 9.6 |
| 12 | .2 Mn $(OAc)_2$:$4H_2O$ | .37 K Br | | 11.2 |
| 13 | .2 Mn $(OAc)_2$:$4H_2O$ | .35 Li Cl | | 5.1 |
| 14 | .2 Mn $(OAc)_2$:$4H_2O$ | .9 35% H Cl | | 11.1 |
| 15 | .2 $V_2O_5$ | .37 K Br | | 5.3 |
| 16 | .2 $V_2O_5$ | .5 48% H Br | | 14.5 |
| 17 | .2 Ga acetate | .37 K Br | | 4.3 |
| 18 | .2 $As_2O_5$ | .5 48% H Br | | 9.2 |
| 19 | .2 $As_2O_5$ | .9 35% H Cl | | .9 |
| 20 | .2 Co $(OAc)_2$:$4H_2O$ | .37 K Br | | 3.7 |
| 21 | .2 Co $(OAc)_2$:$4H_2O$ | .35 Li Cl | | 8.5 |
| 22 | .2Co $(OAc)_2$:$4H_2O$ | .9 35% H Cl | | 9.0 |
| 23 | .2 Cu $(OAc)_2$:$H_2O$ | .37 K Br | | 3.5 |
| 24 | .2 Cu $(OAc)_2$:$H_2O$ | .35 Li Cl | | 4.8 |
| 25 | .2 $H_2Se\ O_3$ | .35 Li Cl | | 2.3 |
| 26 | .2 $H_2Se\ O_3$ | .5 48% H Br | | 5.3 |
| 27 | Cr $(OAc)_3$:$H_2O$ | .37 Li Cl | | .2 |
| 28 | Cr $(OAc)_3$:$H_2O$ | .9 35% H Cl | | .2 |
| 29 | Ag OAc | .5 48% H Br | | 8.2 |
| 30 | .2 Mn $(OAc)_2$:$4H_2O$ | .24 $Br_2$ | 1 hr. | 4.2 |
| 31 | .2 Mn $(OAc)_2$:$4H_2O$ | .24 $Br_2$ | 2 hr. | 7.1 |
| 32 | .2 Mn $(OAc)_2$:$4H_2O$ | .24 $Br_2$ | 4 hr. | 13.6 |
| 33 | .4 Mn $(OAc)_2$:$4H_2O$ | .48 $Br_2$ | 2 hr. | 14.3 |
| 34 | .2 Te $O_2$ | | | 0 |
| 35 | .2 Co $Cl_3$:$7H_2O$ | | | 0 |
| 36 | .2 $Sb_2O_3$ | | | 0 |
| 37 | .2 Mn $(OAc)_2$:$4H_2O$ | | | 0 |
| 38 | .2 $V_2\ O_5$ | | | 0 |
| 39 | .2 Ga acetate | | | 0 |

| 40 | .2 As$_2$C$_5$ | 0 |
| 41 | .2 Cu (OAc)$_2$:H$_2$O | 0 |
| 42 | .2 H$_3$SeO$_3$ | 0 |
| 43 | .2 Cr (OAc)$_3$:H$_2$O | 0 |
| 44 | .2 Ag OAc | 0 |

Runs 1–44 demonstrate the uniqueness of the combination of metals and halogen in my invention. When using a chloride alone without any of the variable metals of my invention, (runs 3 and 4) no ethylene glycol diacetate (EDGA) is formed. Further, when a bromide such as KBr (run 1) or bromine (run 2) is used alone, only a small yield of EGDA is observed. Similarly, when any of the operable metals of my invention is employed, without the use of a halogen source (runs 34–44) no (EGDA) is observed. However, when employing the metals of my invention with a chloride or bromide source (runs 5–33) substantial yields of EGDA are observed.

It has become apparent that the combination of a metal and halogen source leads to unexpectedly high yields as compared to the use of halogen or metal alone. In fact, this combination leads to yields far in excess of the simple additive effect of the halogen and metal, and in many instances leads to yields of 5 to more than 10 times of that which would be expected from a simple additive effect.

When run 5, 13, 29 or 33 is carried out with caproic acid, palmitic acid, succinic acid, chloroproplonic acid, cyanoacetic acid, methoxyacetic acid, 3-methylthiopropionic acid, benzoic acid, p-toluic acid, 2-napthoic acid, m-chlorobenzoic acid, o-nitrobenzoic acid, salicyclic acid, p-hydroxybenzoic acid, m-aminobenzoic, phenylacetic, 2-phenylbutyric, 1-napthtaleneacetic, hexahydrobenzoic, picolinic, nicotinic, 3-indoleacetic, furoic, 2-thiophenacarboxylic or quinolinic in place of acetic acid there is obtained the corresponding ethylene glycol carboxylate compound.

Similarly, when run 8, 22 or 24 is carried out using equivalent amounts of cobalt bromide, cerium hydroxide, copper carbonate, cerium methalate, copper phenoxlate, in place of the metal compound shown, similar results are obtained. Similarly, when equivalent amounts of chlorine, lead bromide, potassium tribromide, 1-chloropropane, cyclohexyl bromide, or ethylene dibromide are used in place of halogen source in runs 5 or 14, there is obtained similar results.

Similarly, when any one of runs 5,8,12,16 or 29 is carried out at temperatures of 80°C., 120°C., 140°C., 180°C., 200°C. for 24, 16,8,1 or one-half hours respectively, similar results are obtained.

Similarly, when manganese bromide, cobalt bromide or antimony chloride is used in place of manganese acetate and lithium chloride in run 13 above, similar results are obtained.

Similarly, when run 23 is carried out using 0.123, 0.74 or 1.85 gms. of K Br in place of 0.37 gms. of K Br, similar results are obtained.

Similarly, when 100 p.s.i.a., 400 p.s.i.a. or 600 p.s.i.a. of ethylene are used in place of 200 p.s.i.a. of ethylene in run 5, similar results are obtained.

EXAMPLE II

Vinyl Acetate

Ethylene glycol diacetate is passed into a stainless steel tube at 550°C. and a space velocity of 0.87 liters/hours/liter of reaction volume. The gaseous effluent is condensed and the vinyl acetate is distilled from the liquid at 72°–73°C. to yield 81 percent vinyl acetate. The temperature is raised successively to 118°–119°C. and 188°–192°C. to remove acetic acid and unreacted ethylene glycol diacetate respectively. The unreacted ethylene glycol diacetate is then recycled to the reactor.

EXAMPLE III

Ethylene Glycol Monoacetate

To 18 millimols of H$_2$O containing 0.03 percent by weight of sulfunic acid, is added 23 millimols of ethylene glycol diacetate obtained from run 6. The reaction mixture is refluxed at 100° to 110°C. for 16 hours. The reaction mixture is then distilled to give 10 millimols of ethylene glycol monoacetate, 1 millimol of ethylene glycol, 12 millimols of acetic acid and 6 millimols of H$_2$O.

Similarly, when any one of the ethylene glycol di-carboxylates, obtained as shown earlier, is used in place of ethylene glycol di-acetate in the above Example, there is obtained ethylene glycol mono carboxylate.

EXAMPLE IV

Ethylene Glycol

To 1.071 millimols of H$_2$O containing 0.03 percent by weight of sulfuric acid, is added 11.0 millimols of ethylene glycol diacetate, obtained from run 5. The reaction mixture is the refluxed for 16 hours at 100°–110°C. The reaction mixture is then distilled to give 0.12 millimols of ethylene glycol diacetate, 1 millimol of ethylene glycol monoacetate, 10 millimols of ethylene glycol and 21 millimols of acetic acid.

Similarly when anyone of the ethylene glycol di-carboxylates, obtained as shown earlier is used in place of ethylene glycol diacetate in the above example, there is obtained ethylene glycol.

EXAMPLE V

The following further illustrates the variety of halogen sources employable in this invention: To a glass lined reactor containing 10 gms. of acetic acid is added 0.2 gms. of TeO$_2$ and 0.6 gms. of Mn Br$_2$· 4H$_2$O. The reaction vessel is then pressurized with 100 p.s.i.a. of oxygen and 200 p.s.i.a. of ethylene. The reaction mixture is then heated, with agitation, for 2 hours at 100°C. Ethylene glycol diacetate yield is 46.8 percent.

Similarly, when equivalent amounts of the bromides of tellurium, cerium, antimony, vanadium, gallium, arsenic, cobalt, copper, selenium and silver are used in place of manganese bromide, similar results are obtained.

I claim:

1. A process for preparing an ethylene glycol ester which comprises intimately contacting ethylene, with a hydrocarbon carboxylic acid having up to 30 carbon atoms, oxygen, an effective amount of a halogen selected form the group consisting of at least one of bromine and a bromine containing compound yielding bromide ions during reaction; and an effective amount of at least one of a variable valence metal cation selected from the group consisting of Ce, Sb, Mn, V, Ga, As, Co, Cr, Cu and Ag; at temperatures from 80°C. to 200°C., to form the desired ester the amount of halogen, expressed as weight % halogen based on total weight of solution, being from 0.01% to 30% and the amount of variable valence metal cation, expressed as equivalents of cation to equivalent of halogen, being from 1:0.01 to 1:100.

2. The process of claim 1 wherein the halogen is selected from the group consisting of bromine, hydrobromic acid, and an alkali and alkaline earth metal bromide.

3. The process of claim 1 wherein the variable valence metal is Ce, Sb, Mn or V.

4. A process for preparing an ethylene glycol ester which comprises intimately contacting ethylene with a hydrocarbon carboxylic acid having up to 30 carbon atoms, oxygen, an effective amount of at least one of a halogen selected from the group consisting of chlorine and a chlorine containing compound yielding chloride ions during reaction; and an effective amount of at least one of a variable valence metal cation selected from the group consisting of Ce, Sb, Mn, V, Ga, As, Co, Cu, Ag and Cr; at temperatures from 80°C. to 200°C., to form the desired ester the amount of halogen, expressed as weight percent halogen based on total weight of solution, being from 0.01 percent to 30 percent and the amount of variable valence metal cation, expressed as equivalents of cation to equivalent of halogen, being from 1:0.01 to 1:100.

5. The process of claim 4 wherein the halogen is selected from the group consisting of chlorine, hydrochloric acid, and an alkali and alkaline earth metal chloride.

6. The process of claim 4 wherein the variable valence metal is Ce, Mn, or Co.

7. A process for preparing an ethylene glycol ester which comprises intimately contacting ethylene, with oxygen, a hydrocarbon carboxylic acid having up to 30 carbon atoms an effective amount of a halogen selected from at least one member of the group consisting of bromine, hydrogen bromide, alkali metal bromides, alkaline earth metal bromides, lower alkyl bromides, and the bromides of Ce, Sb, Mn, Ga, As, Co, Cr, Cu, Ag and V; an effective amount of a variable valence metal cation selected from the group consisting of Ce, Sb, Mn, Ga, As, Co, Cr, Cu, Ag or V; at a temperature of 80°C. to 200°C., wherein the wt. % halogen is from 0.01 to 30 percent, based on the total weight of solution, and the amount of variable valence metal cation expressed in terms of equivalents of cation to equivalents of halogen is from 1:01 to 1:100 to form the desired ester.

8. The process of claim 7 wherein the variable valence metal cation is Ce, Sb, Mn or V, the wt. % of halogen is from 0.1 percent to 20 percent, based on the total weight of solution, the temperature of reaction is from 100° to 200°C. and the ratio of cation to halogen is 1:0.2 to 1:40.

9. A process in accordance with claim 7 wherein the carboxylic acid is acetic acid.

10. A process for preparing an ethylene glycol ester which comprises intimately contacting ethylene, with oxygen, a hydrocarbon carboxylic acid having up to 30 carbon atoms, an effective amount of a halogen selected from at least one member of the group consisting of chlorine, hydrogen chloride, alkali metal chlorides, alkaline earth metal chlorides, lower alkyl chlorides, and the chlorides of Ce, Sb, Mn, Ga, As, Co, Cr, Cu, Ag, and V; an effective amount of a variable valence metal cation selected form the group consisting of Ce, Mn, Sb, V, Ga, As, Cr, Cu, Ag and Co; at temperatures of 80°C. to 200°C., wherein the wt. % halogen is from 0.01 to 30 percent, based on the total weight of solution, and the amount of variable valence metal cation expressed in terms of equivalents of cation to equivalents of halogen is from 1:.01 to 1:100 to form the desired ester.

11. The process of claim 10 wherein the variable valence metal cation is Ce, Mn, Cu or Co; the wt. % halogen is from 0.1 to 20 percent, based on the total weight of solution; the temperature of reaction is from 100° to 200°C. and the ratio of cation to halogen is 1:0.2 to 1:40.

12. A process in accordance with claim 10 wherein the carboxylic acid is acetic acid.

13. A process for preparing an ethylene glycol ester which comprises intimately contacting ethylene with oxygen, a monobasic lower aliphatic hydrocarbon carboxylic acid; a halogen selected form the group consisting of bromine, alkali metal or alkaline earth metal bromide and hydrobromic acid; an effective amount of a variable valence metal cation selected from the group consisting of Ce, Sb, Mn and V; at a temperature of 120° to 180°C., wherein the wt. % halogen is from 0.05 to 10 percent, based on the total weight of solution, and the amount of variable valence metal cation expressed in terms of equivalents of cation to equivalents of halogen is from 1:1 to 1:20, to form the desired ethylene glycol ester.

14. A process for preparing an ethylene glycol ester which comprises intimately contacting ethylene with oxygen, a monobasic lower aliphatic hydrocarbon carboxylic acid; a halogen selected from the group consisting of chlorine, hydrochloric acid and alkali and alkaline earth metal chloride; an effective amount of a variable valence metal cation selected form the group consisting of Ce, Mn, and Co; at a temperature of 120° to 180°C., wherein the wt. % halogen is from 0.05 to 10 percent, based on the total weight of solution, and the amount of variable valence metal cation expressed in terms of equivalents of cation to equivalents of halogen is from 1:1 to 1:20, to form the desired ethylene glycol ester.

15. A process for preparing ethylene glycol diacetate which comprises intimately contacting ethylene, with oxygen, acetic acid, a halogen selected from the group consisting of bromine, and hydrobromic acid; a variable valence metal cation selected from the group consisting of Ce, Sb and Mn at a temperature of 120° to 180°C., wherein the wt. % halogen is from 0.05 to 10 percent, based on the total weight of solution, and the amount of variable valence metal cation expressed in terms of equivalents of cation to equivalents of halogen is from 1:1 to 1:20, to form the desired ethylene glycol diacetate.

16. A process for preparing ethylene glycol diacetate which comprises intimately contacting ethylene, with oxygen, acetic acid, a halogen selected from the group consisting of chlorine and hydrochloric acid; a variable valence metal cation selected form the group consisting of Ce, Mn or Co at a temperature of 120° to 180°C., wherein the wt. % halogen is from 0.05 to 10 percent, based on the total weight of solution, and the amount of variable valence metal cation expressed in terms of equivalence of cation to equivalence of halogen is from 1:1 to 1:20, to form the desired ethylene glycol diacetate.

* * * * *

UNITED STATES PATENT OFFICE
CERTIFICATE OF CORRECTION

Patent No. 3,689,535　　　　　　　Dated September 5, 1972

Inventor(s) John Kollar

It is certified that error appears in the above-identified patent and that said Letters Patent are hereby corrected as shown below:

Column 7, line 2, Run 42, "$H_3SeO_3$" should read -- $H_2SeO_3$ --.

Column 8, line 30, "1.071" millimols should read -- 1071 --; lines 33 and 34, "100°-11 0°" should read -- 100°-110° --.

Signed and sealed this 6th day of March 1973.

(SEAL)
Attest:

EDWARD M. FLETCHER, JR.　　　　　　　ROBERT GOTTSCHALK
Attesting Officer　　　　　　　　　　　Commissioner of Patents